Patented Apr. 9, 1940

2,196,885

UNITED STATES PATENT OFFICE 2,196,885

READILY SOLUBLE BASIC COLORING MATTER

Max Wyler, Blackley, Manchester, England, assignor to Imperial Chemical Industries Limited, a corporation of Great Britain No Drawing. Application May 10, 1938, Serial No. 207,153. In Great Britain May 18, 1937

11 Claims. (Cl. 260—391)

This invention relates to the manufacture of readily soluble basic colors.

Some basic dyestuffs, for instance Victoria Blue B, as sold are not freely soluble in water and this lack of ready solubility restricts their field of application, for instance it makes them less suitable for use in topping, i. e. for over-dyeing already dyed materials in order to give brighter dyeings. Other colored compounds, e. g. the condensation product of 4,4'-di(dimethylamino)benzophenone with p-tolyl-m-phenetidine, are known which cannot be made into a form suitable for use as dyestuffs, because although the compounds are basic in character, those of their salts which would usually be made are not soluble, or only very sparingly soluble, in water.

According to the present invention basic colors, i. e. basic coloring matters and other basic colored compounds are made readily soluble in water by using aminosulphonic acid (also called sulphamic acid) or a soluble salt thereof.

The invention is carried into practical effect in various ways. Thus the free base, which will be in many cases a carbinol base, of a basic coloring matter or other basic colored compound, this free base having been previously prepared, if necessary, from a salt or other available derivative, may be mixed with sulphamic acid. The mixtures may be made up from their constituents either in the form of aqueous pastes or solids or both, and when the product is in paste form it may be dried subsequently, if desired. The resulting mixtures dissolve readily in water, generally even in cold water. Solid preparations are especially suitable for commercial use. As an illustration, the commercial basic coloring materials which are salts, e. g. hydrochlorides or sulphates are stirred with water to which has been added sufficient caustic alkali to precipitate the base, the base is filtered off and either mixed with sulphamic acid and then if desired dried, or the base may be dried first and then mixed with sulphamic acid. Instead of carrying the invention into practical effect by making mixtures it can be done by making sulphamates of the abovementioned free bases, for instance by reacting the free base with sulphamic acid. As an illustration of this latter method, to a solution or suspension of the commercial dyestuff in the form of base and as usually isolated, i. e. before standardisation, there is added sulphamic acid, the liquor is then boiled for a short time, and the dyestuff salt is isolated by crystallisation or by addition of sodium chloride.

The abovementioned salts are new chemical compounds. The invention comprises also these new chemical compounds and also the readily soluble solid preparations comprising the free base of a basic coloring matter or other basic colored compound in admixture with sulphamic acid. It also comprises the products obtained by the processes above described.

The invention is illustrated but not limited by the following examples in which the parts are by weight.

Example 1

20 parts of the carbinol base of Rhodamine B (see "Colour Index" No. 749 or Schultz's "Farbstofftabellen," 7th edition, No. 864) are mixed with 5 parts of sulphamic acid, both ingredients of the mixture being well powdered. There is thus obtained a pale pink powder which dissolves in cold water with great ease, with the color of a solution of Rhodamine B.

Example 2

20 parts of the carbinol base of Victoria Blue B (see "Colour Index" No. 729 or Schultz's "Farbstofftabellen," 7th edition, No. 822) and 6 parts of sulphamic acid are well ground together as in Example 1. The orange-brown powder obtained is readily water soluble. The solution is in appearance like that of Victoria Blue B and does not show any bronzing. Victoria Blue R carbinol base treated in exactly the same way behaves similarly.

Example 3

20 parts of the base of Acridine Orange (see "Colour Index" No. 788 or Schultz's "Farbstofftabellen," 7th edition, No. 902) and 6 parts of sulphamic acid are treated as in Example 1. The product is an orange colored powder very freely soluble in water.

Example 4

20 parts of the condensation product of 4,4'-di(dimethylamino)benzophenone with p-tolyl-m-phenetidine which is practically insoluble in water, are mixed with 1000 parts of water. The mixture is boiled, aqueous caustic soda solution is added till the mixture is alkaline to test paper, the carbinol base is separated by filtering, and mixed with 8 parts sulphamic acid. The mixture is dissolved in 500 parts of hot water and the solution is filtered. From the filtrate the sulphamic salt of the dyestuff crystallizes in blue needles, which are readily water soluble and dye tanned cotton in much redder shades than Victoria Blue R.

Example 5

27 parts of the condensation product of 4,4'-di(dimethylamino)benzophenone and αβ-dinaphthylamine (obtained by using phosphorus oxychloride as condensing agent, and in the form of the hydrochloride) which is quite insoluble in water, are mixed with 6.5 parts of ammonium sulphamate. The blue green crystalline powder is readily soluble in hot water and gives on tannin-mordanted cotton blue shades, which are greener than those obtained with Victoria Blue R.

Example 6

100 parts of the carbinol base of Methyl Violet 2B (see "Colour Index" No. 680 or Schultz's "Farbstofftabellen," 7th edition, No. 783) and 40 parts of sulphamic acid are well ground together. The blue violet powder which is obtained dissolves in cold water with great ease and does not show scumming.

Example 7

85 parts of the carbinol base of Methyl Violet R (see "Colour Index" No. 680 or Schultz's "Farbstofftabellen", 7th edition, No. 783) and 26 parts of sulphamic acid are well ground together. The violet powder which is obtained dissolves in cold water to a clear solution, which is free from scum.

I claim:

1. Basic colors readily soluble in water selected from the group consisting of a sulphamic acid salt of a basic color and a mixture of a free base of a basic color and sulphamic acid, said basic color being one selected from the triarylmethane, xanthene and acridine classes of colors.

2. Basic triarylmethane colors readily soluble in water selected from the group consisting of a sulphamic acid salt of a basic triarylmethane color and a mixture of a free base of a basic triarylmethane color and sulphamic acid.

3. A mixture of a free base of a basic color and sulphamic acid, said basic color being one selected from the triarylmethane, xanthene and acridine classes of colors, said mixture being readily soluble in water.

4. A mixture of a free base of a basic triarylmethane color and sulphamic acid, said mixture being readily soluble in water.

5. A sulphamic acid salt of a basic triarylmethane color, said salt being readily soluble in water.

6. A sulphamic acid salt of a basic color, said basic color being one selected from the triarylmethane, xanthene and acridine classes of colors, said salt being readily soluble in water.

7. A process of making a mixture of a free base of a basic color and sulphamic acid which comprises mixing a free base of a basic color selected from the triarylmethane, xanthene and acridine classes of colors with sulphamic acid and then drying.

8. A process of making a mixture of a free base of a basic color and sulphamic acid which comprises treating a hydrochloride of a basic color selected from the triarylmethane, xanthene and acridine classes of colors with water to which has been added sufficient caustic alkali to precipitate the free base, filtering off the free base, and then mixing it with sulphamic acid.

9. A process of making a mixture of a free base of a basic color and sulphamic acid which comprises treating a sulfate of a basic color selected from the triarylmethane, xanthene and acridine classes of colors with water to which has been added sufficient caustic alkali to precipitate the free base, filtering off the free base, and then mixing it with sulphamic acid.

10. A process of making a sulphamic acid salt of a basic color which comprises adding sulphamic acid to a free base of a basic color in water, boiling the liquor containing said two reactants, and isolating the sulphamate of the basic color, said basic color being one selected from the triarylmethane, xanthene and acridine classes of colors.

11. A process of making a sulphamic acid salt of a basic color which comprises adding ammonium sulphamate to a basic color in the form of a salt in water, boiling the liquor containing said two reactants, and isolating the sulphamate of the basic color, said basic color being one selected from the triarylmethane, xanthene and acridine classes of colors.

MAX WYLER.